(12) United States Patent
Wolfgang

(10) Patent No.: US 10,508,761 B2
(45) Date of Patent: Dec. 17, 2019

(54) COUPLING FOR CONNECTING TWO CONDUITS OF A VACUUM CONVEYING DEVICE TO EACH OTHER AND VACUUM CONVEYING DEVICE

(71) Applicant: Motan Holding GmbH, Constance (DE)

(72) Inventor: Karl Wolfgang, Leutkirch (DE)

(73) Assignee: Motan Holding GmbH, Constance (DE)

( * ) Notice: Subject to any disclaimer, the term of this patent is extended or adjusted under 35 U.S.C. 154(b) by 202 days.

(21) Appl. No.: 15/697,490

(22) Filed: Sep. 7, 2017

(65) Prior Publication Data
US 2018/0073670 A1 Mar. 15, 2018

(30) Foreign Application Priority Data

Sep. 12, 2016 (DE) .................. 10 2016 011 204

(51) Int. Cl.
*F16L 37/084* (2006.01)
*F16L 33/22* (2006.01)
*F16L 55/168* (2006.01)

(52) U.S. Cl.
CPC .......... *F16L 33/22* (2013.01); *F16L 37/0841* (2013.01); *F16L 55/168* (2013.01)

(58) Field of Classification Search
CPC . F16L 37/096; F16L 2201/10; F16L 37/0847; F16L 37/0848
USPC .................................................... 285/7, 93
See application file for complete search history.

(56) References Cited

U.S. PATENT DOCUMENTS

| 1,740,015 | A | * | 12/1929 | Hooper | F16L 37/096 251/149.6 |
| 2,634,451 | A | * | 4/1953 | Dow | A47L 9/0045 285/7 |
| 4,444,419 | A | * | 4/1984 | Maeshiba | F16L 37/096 285/12 |
| 8,439,404 | B2 | * | 5/2013 | Anton | F16L 19/05 285/93 |
| 2010/0078265 | A1 | | 4/2010 | Drew et al. | |
| 2011/0018254 | A1 | | 1/2011 | Kück et al. | |
| 2013/0196524 | A1 | * | 8/2013 | Cecchinelli | F16L 37/098 439/191 |
| 2016/0229680 | A1 | * | 8/2016 | Cornett | B67D 7/3218 |

FOREIGN PATENT DOCUMENTS

| DE | 3726778 A1 | * | 3/1989 | .............. A47L 9/242 |
| DE | 20 2004 002 116 U1 | | 7/2004 | |
| DE | 10 2005 029 061 A1 | | 1/2007 | |
| DE | 20 2016 104 141 | | 10/2016 | |
| WO | WO-2007129958 A1 | * | 11/2007 | .............. F16L 37/08 |
| WO | 2010/007084 | | 1/2010 | |

* cited by examiner

*Primary Examiner* — David Bochna
(74) *Attorney, Agent, or Firm* — Gudrun E. Huckett

(57) ABSTRACT

A coupling for connecting conduits of a vacuum conveying device with each other has a coupling piece to be disposed on a first conduit and a counter coupling piece to be disposed on a second conduit, wherein the second conduit is flexible. The counter coupling piece is insertable into coupling piece. A holding ring is disposed on the second conduit so as to be freely rotatable on the second conduit about an axis of the counter coupling piece. A transponder is supported on the holding ring. A sensor disposed on the first conduit is operatively correlated with the transponder.

13 Claims, 1 Drawing Sheet

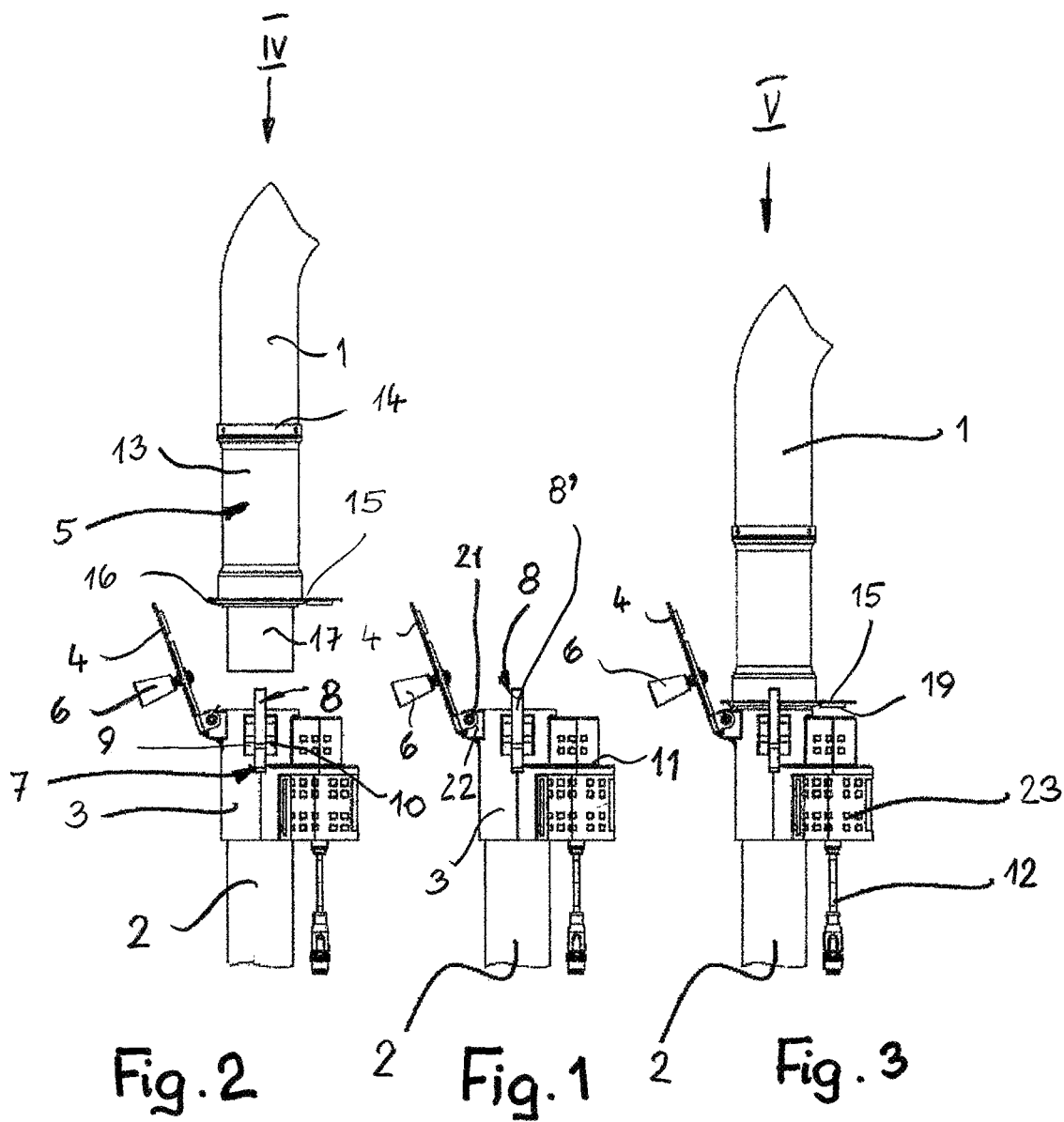
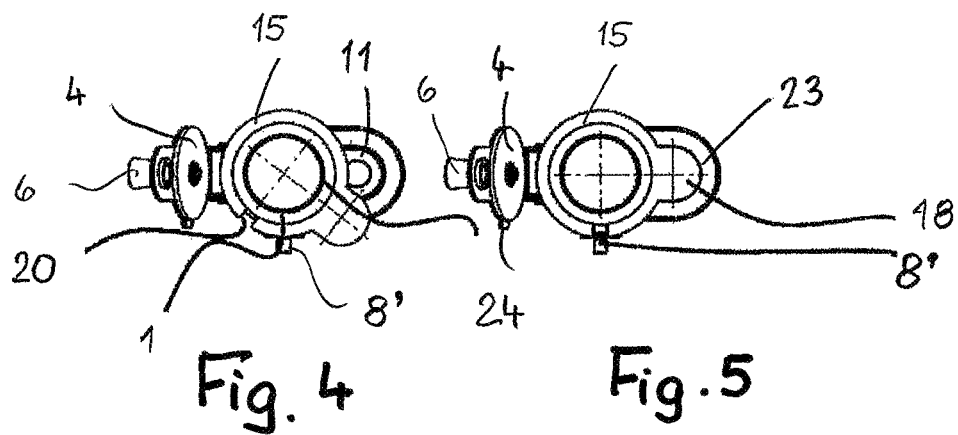

COUPLING FOR CONNECTING TWO CONDUITS OF A VACUUM CONVEYING DEVICE TO EACH OTHER AND VACUUM CONVEYING DEVICE

BACKGROUND OF THE INVENTION

The invention concerns a coupling for connecting two conduits of a vacuum conveying device to each other, with a coupling piece provided on the first conduit and with a counter coupling piece which is insertable into the coupling piece and provided on the second flexibly configured conduit. The invention further relates to a vacuum conveying device with such couplings.

Such vacuum conveying devices have, for example, storage containers in which bulk material is stored. Each storage container can be connected by conduits to receivers, for example, to processing machines for the bulk material. In order to be able to connect any storage container with any receiver, coupling stations are employed to which the conduits coming from the storage containers are fixedly connected. By means of couplings, these conduits are connected to vacuum conduits extending to the respective receivers. The vacuum conduits that are extending to the receivers are flexible hoses which, in practice, are generally contorted or twisted or also entangled with other hoses within the vacuum conveying device. Upon insertion of the counter coupling piece of the flexible hose into the coupling piece within the coupling station, this causes a strong restoring force that makes coupling difficult.

In order to ensure proper coupling between two conduits, it is known to provide a sensor on the coupling piece, in particular an RFID sensor, and a corresponding transponder on the flexible conduit. For the coupling process, it is required that the transponder is precisely positioned opposite the sensor. Due to the restoring force, it is often difficult in practice to connect the flexible conduits in such a way to the supply conduits that the transponder is precisely aligned so as to be opposite the sensor.

The invention has therefore the object to design the coupling of the aforementioned kind and the vacuum conveying device such that the conduits can be plugged together in a simple way.

SUMMARY OF THE INVENTION

This object is solved for the coupling of the aforementioned kind in accordance with the invention in that a holding ring supporting a transponder is freely rotatable on the second conduit about the axis of the counter coupling piece and in that a sensor on the first conduit is correlated with the transponder.

The vacuum conveying device is characterized in that it comprises couplings wherein a holding ring supporting a transponder is freely rotatable on the second conduit about the axis of the counter coupling piece and in that a sensor on the first conduit is correlated with the transponder.

The coupling according to the invention is designed such that the counter coupling piece of the flexible conduit can be inserted in any position into the first conduit. Since the holding ring is rotatably supported, the transponder fastened on it can be adjusted by rotation of the holding ring such that the transponder is positioned opposite the sensor. Then, a reliable signal transmission to a control unit of the vacuum conveying device is enabled by means of which it is signaled that the conduits are properly plugged together. Even in case the flexible conduit is twisted very much about its axis or entangled with other flexible hoses of the vacuum conveying device, such flexible conduits can be plugged together without problem because during the coupling process it is not necessary to pay attention to the position of the transponder relative to the sensor. The holding ring can be rotated relative to the flexible conduit into the required position.

In order to facilitate the adjustment of the holding ring, it is advantageous to connect the holding ring fixedly with a grip member. By means of the grip member, the holding ring can be very easily rotated.

In an advantageous embodiment, the grip member is embodied sleeve-shaped and is seated on the counter coupling piece. The grip member can therefore be configured to be long so that it can be gripped comfortably by the hand of the user and rotated.

Advantageously, the holding ring is designed as a flat annular disk so that it requires only little mounting space.

It is advantageous when the holding ring comprises at least one cutout for the engagement of a locking element. By means of it, the holding ring and thus the flexible conduit can be secured against accidental removal from the first conduit.

In a simple embodiment, the locking element comprises a locking nose that engages across the holding ring in coupling position. In this way, a reliable protection against accidental removal of the flexible conduit results.

It is advantageous when a cover for closing off the coupling piece is pivotably supported on the coupling piece. When the flexible conduit with its counter coupling piece is not inserted into the first conduit, the coupling piece is closed off by the cover. Since it is supported pivotably on the coupling piece, it is available anytime.

It is advantageous when the cover is spring-loaded in the direction of its open position. In this way, it is ensured that, in its open position, the cover does not hinder the insertion of the flexible conduit.

In order for the cover to be held in the closed position despite spring loading action, it is secured advantageously by the locking element. When the cover is released by the locking element, the cover can pivot automatically into its open position as a result of the spring load.

In a simple embodiment, the cover is provided with a projecting tongue which is engaged across by the locking element in the closed position of the cover. The tongue can be embodied to be one piece together with the cover. However, it is also possible to attach the tongue as a separate element to the cover.

In order to be able to actuate the locking element in a simple way, it is advantageously embodied as a two-arm lever whose one lever arm is formed by the locking nose. With the other lever, the locking nose can be pivoted out of its locking position into a release position.

The vacuum conveying device with the couplings according to the invention enables a simple coupling action of the various flexible conduits with the connectors of the first conduits which are present at the coupling station.

The subject matter of the application results not only from the subject matter of the individual claims but also from all specifications and features disclosed in the drawings and the description. Even if they are not subject matter of the claims, they are claimed as being important to the invention in so far as they are, individually or in combination, novel with respect to the prior art.

Further features of the invention result from the additional claims, the description, and the drawings.

BRIEF DESCRIPTION OF THE DRAWINGS

The invention will be explained in more detail with the aid of an embodiment illustrated in the drawings.

FIG. 1 shows in a side view a coupling piece of a coupling according to the invention that is seated on a supply conduit.

FIG. 2 shows a flexible vacuum conduit with a counter coupling piece of the coupling according to the invention prior to joining with the supply conduit.

FIG. 3 shows the vacuum conduit inserted into the supply conduit.

FIG. 4 is a view in the direction of arrow IV in FIG. 2.

FIG. 5 is a view in the direction of arrow V in FIG. 3.

DESCRIPTION OF PREFERRED EMBODIMENTS

The coupling serves to couple a flexible vacuum conduit 1 with a supply conduit 2. The vacuum conduit 1 and the supply conduit 2 are part of a vacuum conveying device for bulk material. Such vacuum conveying devices serve, for example, for distributing plastic granules or powder to different machines or devices in which the granules or powder is further processed. The supply conduits and the associated couplings and vacuum conduits form, for example, a so-called coupling station that enables to configure the conveying paths of the bulk material, as needed, in that the vacuum conduit 1 is connected to the respective desired supply conduit 2. The coupling can be coupled and decoupled in a simple way and is configured such that the bulk material flows through the coupling in way gentle to the material. Also, the coupling is designed such that it is gas-tight so that no foreign air is sucked into the vacuum conveying device.

On the end of the supply conduit 2, a coupling piece 3 is fastened that is designed as a sleeve and is comprised of metal or a hard plastic material. The coupling piece 3 projects axially past the free end of the supply conduit 2.

On the exterior wall of the coupling piece 3, a cover 4 is pivotably supported with which the supply conduit 2 can be air-tightly closed off when the supply conduit 2 is not coupled with a vacuum conduit 1. In FIGS. 1 through 5, the cover 4 is illustrated respectively in open position in which it is pivoted outwardly so far that the vacuum conduit 1 with a counter coupling piece 5 can be inserted easily into the coupling piece 3.

The cover 4 is advantageously subjected to the force of at least one spring which loads the cover 4 into the open position illustrated in FIGS. 1 through 5. On its exterior side, the cover 4 is provided with a handle 6 with which it can be easily adjusted into the closed position in which the cover 4 is contacting seal-tightly the end face of the sleeve-shaped coupling piece 3.

In operation of the vacuum conveying device, the cover 4 as a result of the vacuum in the conduits of the vacuum conduit device is tightly pulled against the end face of the coupling piece 3 so that a seal-tight closure is ensured.

On the exterior side of the coupling piece 3, a holding device 7 is provided. It has a pivotably supported locking element 8 that is designed as a two-arm lever. One lever arm thereof is designed as a locking nose 8' which is projecting axially past the end face of the coupling piece 3. The locking element 8 is pivotably supported between two arms 9, 10 under spring force on the exterior side of the coupling piece 3.

The holding device 7 is arranged at a spacing to the bearing of the cover 4. The locking element 8 is resting under spring force against a stop (not illustrated) in such a way that the locking nose 8' is positioned in the insertion path of the counter coupling piece 5.

Advantageously, the holding device 7 has an angular spacing of 90° relative to the bearing of the cover 4.

Moreover, from the exterior side of the sleeve-shaped coupling piece 3 a securing tab 11 is projecting by means of which an RFID sensor 12 is secured. It is connected to a control unit and sends a sensor signal to the latter as soon as the vacuum conduit 1 is inserted with the counter coupling piece 5 into the coupling piece 3 of the supply conduit 2 and is property locked. These sensor signals can be transmitted wireless but also wire-bound to the control unit.

The securing tab 11 is located at a spacing relative to the cover bearing and to the holding device 7. In the illustrated embodiment, the securing tab 11 is advantageously positioned diametrically opposite the cover bearing on the exterior side of the coupling piece 3.

The counter coupling piece 5, like the coupling piece 3, is embodied sleeve-shaped and surrounds the corresponding end of the flexible vacuum conduit 1. On the counter coupling piece 5, a grip member 13 is seated that is cylindrically embodied.

The grip member 13 is positioned between a securing ring 14 which is fastened to the vacuum conduit 1 and a flat annular disk-shaped locking disk 15 as a holding ring. The holding ring or locking disk 15 is freely rotatable about the axis of the vacuum conduit 1 as well as of the counter coupling piece 5. The locking disk 15 is supported on a radial outwardly projecting annular flange 16 of a coupling sleeve 17 which is part of the counter coupling piece 5 and which is inserted into the sleeve-shaped coupling piece 3.

The locking disk 15 is provided with a radially projecting tab 18 having a transponder 19 attached to its underside which is interacting with the sensor 12. The locking disk 15 is furthermore provided on the circumference with a cutout 20 that is engaged by the locking nose 8' in the locked position. The size of the cutout 20 is matched to the locking nose 8'. In this way, it is achieved that in the locked position the vacuum conduit 1 is connected reliably to the supply conduit 2.

When the vacuum conduit 1 is to be connected to the supply conduit 2, first the cover 4 is pivoted about an axis 21, which is positioned tangential to the coupling piece 3, so far outwardly that the coupling sleeve 17 of the vacuum conduit 1 can be inserted into the sleeve-shaped coupling piece 3. In the open position, the cover 4 with its rim is contacting a holder 22 which is accommodating the pivot axis 21.

The locking nose 8' is pivoted inwardly under a spring force so far that it is positioned in the movement path of the locking disk 15 during the insertion process. The locking nose 8' has a slanted end face onto which the locking disk 15 with its rim moves upon insertion of the coupling sleeve 17 into the coupling piece. The locking nose 8' is pivoted by means of the slanted surface against the spring force in outward direction until the locking disk 15 is contacting the end face of the coupling piece 3. Now the locking nose 8', under spring force, can return into its locking position in which the locking nose 8' engages across the locking disk 15.

Since the locking disk 15 is freely rotatable about the axis of the counter coupling piece 5, the vacuum line 1 can be inserted into the coupling piece 3 while the coupling sleeve 17 is in any position. The locking disk 15 can then be rotated such that the transponder 19 can be detected by the sensor 12.

The coupling piece 3 is advantageously provided for easy mounting of the sensor 12 with a removable cover 23.

It is advantageous when the locking disk 15 is fixedly connected to the grip member 13, advantageously by means of screws. In this case, the grip member 13 is seated rotatably on the vacuum conduit 1 and is rotated together with the locking disk 15 such that the transponder 19 is positioned opposite the sensor 12.

In this aligned position, the cutout 20 in the locking disk 15 is positioned opposite the locking nose 8' of the holding device 7 so that the locking nose 8' in the described way engages the cutout 20 and advantageously engages across the locking disk 15.

The locking nose 8' and the locking disk 15 can also be designed such that the locking nose 8' does not engage across the locking disk 15 but only engages the cutout 20. Then the locking nose 8' serves only to secure the locking disk 15 against rotation. The coupling sleeve 17 is indeed designed such that with its outer wall it is substantially gas-tightly contacting the inner wall of the coupling piece 3. Due to the vacuum which is existing in the conveying device, the coupling sleeve 17 is pulled tightly into the coupling piece 3. On the bottom side of the locking disk 15, there is a flat seal (not illustrated) resting against the rim of the coupling piece 3 and enhancing the gas-tight connection between the vacuum conduit 1 and the supply conduit 2. Since the sealing action is realized by means of the flat seal, the connection can also be easily detached again.

The flat seal is located outside of the flow path of the bulk material through the coupling. Therefore, the bulk material comes into contact only with the material of the coupling piece 3 and counter coupling piece 5. Damage to the conveyed material by means of seals and other foreign materials is avoided.

When removing the vacuum conduit 1 from the supply conduit 2, the securing ring 14 prevents that the grip member 13 including the locking disk 15 is displaced on the vacuum conduit 1.

Since the locking disk 15 is rotatable about the axis of the vacuum conduit 1, it can also be inserted in twisted (relatively rotated) state into the supply conduit 2. Thereafter, the locking disk 15 can be rotated or turned such that the transponder 19 is positioned opposite the sensor 12 so that the control unit receives a signal that the vacuum conduit 1 is coupled properly with the supply conduit 2. Since the locking disk 15 is advantageously fixedly connected to the sleeve-shaped grip member 13, the locking disk 15 can be comfortably brought into the required rotational position by means of the grip member 13.

In an advantageous embodiment, the cover 4 is secured in the closed position by the holding device 7. For this purpose, on the rim of the cover 4, a radially projecting tongue 24 is provided (FIG. 5) which in closed position of the cover 4 is engaged across by the locking nose 8' of the holding device 7. When the locking nose 8' is pivoted back into its release position, it releases the cover 4 which then under spring force is pivoted into its open position.

The specification incorporates by reference the entire disclosure of German priority document 10 2016 011 204.2 having a filing date of 12 Sep. 2016.

While specific embodiments of the invention have been shown and described in detail to illustrate the inventive principles, it will be understood that the invention may be embodied otherwise without departing from such principles.

What is claimed is:

1. A coupling for connecting conduits of a vacuum conveying device with each other, the coupling comprising:
   a coupling piece configured to be disposed on a first conduit;
   a counter coupling piece configured to be disposed on a second conduit, wherein the second conduit is flexible, wherein the counter coupling piece is configured to be inserted into said coupling piece;
   a holding ring configured to be disposed on the second conduit so as to be freely rotatable on the second conduit about an axis of the counter coupling piece, wherein the holding ring is a flat annular disk;
   a transponder supported on the holding ring;
   a sensor configured to be disposed on the first conduit and operatively correlated with the transponder.

2. The coupling according to claim 1, further comprising a grip member configured to be disposed on the second conduit, wherein the holding ring is connected fixedly to the grip member.

3. The coupling according to claim 2, wherein the grip member is a sleeve and is seated on the counter coupling piece.

4. A vacuum conveying device comprising vacuum conduits, supply conduits, and one or more couplings according to claim 1, wherein said couplings are configured to plug together one of the vacuum conduits and one the supply conduits, respectively.

5. A coupling for connecting conduits of a vacuum conveying device with each other, the coupling comprising:
   a coupling piece configured to be disposed on a first conduit;
   a counter coupling piece configured to be disposed on a second conduit, wherein the second conduit is flexible, wherein the counter coupling piece is configured to be inserted into said coupling piece;
   a holding ring configured to be disposed on the second conduit so as to be freely rotatable on the second conduit about an axis of the counter coupling piece;
   a transponder supported on the holding ring;
   a sensor configured to be disposed on the first conduit and operatively correlated with the transponder;
   a locking element, wherein the holding ring is provided with at least one cutout configured to engage the locking element.

6. The coupling according to claim 5, wherein the holding ring is a flat annular disk.

7. The coupling according to claim 5, wherein the locking element comprises a locking nose which engages across the holding ring in a coupling position in which said coupling piece and the counter coupling piece are coupled to each other.

8. The coupling according to claim 5, further comprising a cover pivotably supported on said coupling piece and configured to close off said coupling piece.

9. The coupling according to claim 8, wherein the cover is spring-loaded in a direction of an open position of the cover.

10. The coupling according to claim 8, wherein the cover is secured by the locking element in a closed position of the cover.

11. The coupling according to claim 10, wherein the cover comprises a projecting tongue which is engaged across by the locking element in the closed position of the cover.

12. The coupling according to claim 5, wherein the locking element is a two-arm lever comprising a first lever arm and a second lever arm, wherein the first lever arm is a locking nose.

13. A vacuum conveying device comprising vacuum conduits, supply conduits, and one or more couplings according to claim 5, wherein said couplings are configured to plug together one of the vacuum conduits and one the supply conduits, respectively.

\* \* \* \* \*